No. 652,230. Patented June 19, 1900.
M. I. PUPIN.
ART OF REDUCING ATTENUATION OF ELECTRICAL WAVES AND APPARATUS THEREFOR.
(Application filed Dec. 14, 1899.)

(No Model.) 2 Sheets—Sheet 1.

Witnesses:
Samuel W. Balch
H. H. Whitman

Inventor,
Michael I. Pupin,
By Thomas Ewing Jr
Attorney.

THE NORRIS PETERS CO., PHOTO-LITHO., WASHINGTON, D. C.

No. 652,230. Patented June 19, 1900.
M. I. PUPIN.
ART OF REDUCING ATTENUATION OF ELECTRICAL WAVES AND APPARATUS THEREFOR.
(Application filed Dec. 14, 1899.)
(No Model.) 2 Sheets—Sheet 2.

Witnesses:
Samuel W. Balch
H. A. Whitman

Inventor
Michael I. Pupin
by Thomas Ewing Jr.
Attorney

UNITED STATES PATENT OFFICE.

MICHAEL I. PUPIN, OF YONKERS, NEW YORK.

ART OF REDUCING ATTENUATION OF ELECTRICAL WAVES AND APPARATUS THEREFOR.

SPECIFICATION forming part of Letters Patent No. 652,230, dated June 19, 1900.

Application filed December 14, 1899. Serial No. 740,238. (No model.)

*To all whom it may concern:*

Be it known that I, MICHAEL I. PUPIN, a citizen of the United States of America, and a resident of Yonkers, county of Westchester, and State of New York, have invented certain new and useful Improvements in the Art of Reducing Attenuation of Electrical Waves and Apparatus Therefor, of which the following is a specification.

My invention consists in an improvement in the construction and installation of conductors for the transmission of electrical energy by means of electrical waves, whereby by decreasing the current necessary to transmit the amount of energy required the attenuation of such waves is reduced, and therefore the efficiency of transmission is increased.

Electrical conductors—say a given length of copper wire—possess ohmic resistance, self-inductance, and electrostatic capacity. A variable electrical current in such a conductor is accompanied by three distinct kinds of reactions—viz., the resistance reaction, self-inductance reaction, and the displacement of electrostatic reaction. In overcoming these reactions the impressed electromotive force does three kinds of work which appear, respectively, as, first, heat generated in the conductor, and as energy which is stored in the medium surrounding the conductor in the form of, second, magnetic and, third, electrostatic strains. The laws governing these three reactions govern the flow of variable currents in wire conductors. A mathematical discussion of the laws of flow of variable currents in long wire conductors was first given by Professor William Thomson (now Lord Kelvin) in 1855. His theory was considerably extended by the late Professor G. Kirchhoff in 1857. Since that time the subject has been very extensively studied by many investigators, particularly in connection with the modern developments in telegraphy, telephony, and long-distance transmission of power by alternating currents.

I have also been engaged for several years in experimental and mathematical researches of this subject, some of the results of which were given in a paper read before the American Institute of Electrical Engineers on March 22, 1899. This paper, which is entitled "Propagation of Long Electrical Waves," is published in Vol. XV of the transactions of that society, and frequent references will be made to it in the course of this application.

In the accompanying drawings, which form a part of this specification, " Figs. 11 and 12 are details of apparatus.

The main results of the theory of the propagation of electrical waves in long wire conductors should be stated here briefly for the purpose of placing the claims of this application in their true light. A mechanical analogy will add much to the clearness of this statement.

Figure 1:
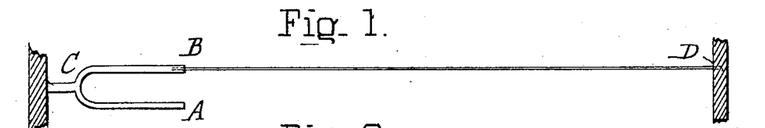
Figure 1 is a diagram illustrating a tuning-fork and a string to be vibrated thereby.
Figure 2:
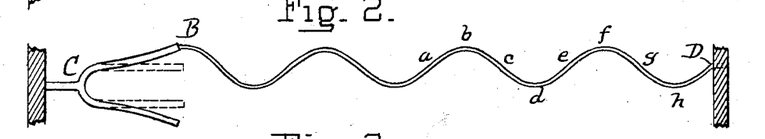
Fig. 2 is a diagram illustrating the waves set up in this string when it is executing forced vibrations in air under the action of the tuning-fork.
Figure 3:
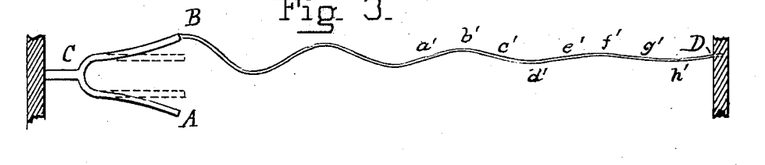
Fig. 3 is a diagram illustrating the same apparatus with the string executing forced vibrations in a medium which offers appreciable resistance to the vibrations of the string.

In diagram of Fig. 1, A B C is a tuning-fork which is rigidly fixed at its neck C. To the free extremity of prong B is attached a heavy flexible string B D. This string is supposed to be under a certain tension, and one of its terminals is fixed at D. Its position of equilibrium is represented by the full line B D. Suppose now that the tuning-fork is made to vibrate steadily by an electromagnet or otherwise. The string will vibrate with it, the vibrations of the string being forced vibrations—that is, vibrations which follow the period of the tuning-fork. Two principal forms of vibration will be described here briefly. The form of stationary waves is represented in diagram of Fig. 2. This form is obtained when the internal and external frictional resistances are negligibly small. The waves travel with undiminished amplitude. Hence the direct wave coming from the tuning-fork and the reflected wave coming from the fixed point D will have the same amplitude, and therefore by their interference stationary waves will be formed with fixed nodes at $a\ c\ e\ g$ D and ventral segments at $b\ d\ f\ h$. When, however, internal and external frictional resistances are not negligibly small, then a progressive attenuated system of waves is formed, which is illustrated in diagram of Fig. 3. The amplitude of the wave is continually diminished in its progress from B to D on account of the frictional resistances. After its reflection at D the returning wave, having a smaller amplitude than the oncoming wave, cannot form by interference with it a system of stationary waves. The string therefore does not present to an observer a definite wave form, as in the case of stationary waves. Its appearance is continually changing. If, however, we observe the string by means of a rotating mirror or by properly-timed electrical sparks, we shall see the string as represented by curve $a'\ b'\ c'\ d'\ e'\ f'$ in Fig. 3. It is a wave curve with continually diminishing amplitude due to attenuation. Assuming that the frictional-resistance reactions are proportional to the velocity, the attenuation ratio (the ratio of amplitudes of two successive half-waves) will be a constant quantity. The velocity of propagation, which fixes the wave length for a given frequency, and the attenuation ratio are the most characteristic constants of the curve. Both of these depend on the density of the string, its tension, frictional-resistance, and frequency. For instance, the greater the tension, other things being equal, the greater will be the velocity of propagation, and hence the longer the wave length for a given frequency. That which is of particular importance is the attenuation ratio and its relation to the density of the string. By substituting strings of greater and greater density we can diminish the attenuation to anything we please in spite of the presence of the frictional resistance, and, vice versa, by making the string lighter and lighter we can increase the attenuation. In other words, a dense string transmits wave energy more efficiently than a light one. This important physical fact has a direct bearing upon the fundamental physical principles on which this application rests. It is therefore important to formulate a clear physical view of it. The energy which the string receives from the tuning-fork and then transmits toward D exists partly as kinetic energy or energy of motion of the string's mass and partly as potential energy or energy of deformation of the string. The process of propagation of a wave consists in the successive transformation of the kinetic part of the total energy into potential energy, and vice versa. During this transformation a part of the energy is lost as heat on account of the frictional reactions. These reactions are supposed to be proportional to the velocity, so that the rate of loss due to these reactions will be proportional to the square of the velocity. Consider now the kinetic energy of an element of the string. It is proportional to the product of mass into the square of its velocity. Making the mass $n^2$ times as large we shall be able to store up in the element the same amount of kinetic energy with only 1-$n$th of the velocity; but since the rate of dissipation into heat due to frictional resistances is proportional to the square of velocity it follows that in the second case the element of the string transmits the same amount of energy with only 1-$n^2$th part of the loss. In other words, the heat loss is approximately inversely proportional to the density of the string. The physical fact that dense strings transmit energy more efficiently than light ones is therefore reduced to the fundamental principle that dense strings require a smaller velocity in order to store up a given amount of kinetic energy, and smaller velocity means a smaller dissipation into heat and therefore a smaller attenuation of the wave. The denser the string the more nearly will its vibration approach the form of stationary waves.

Figures 4, 5:
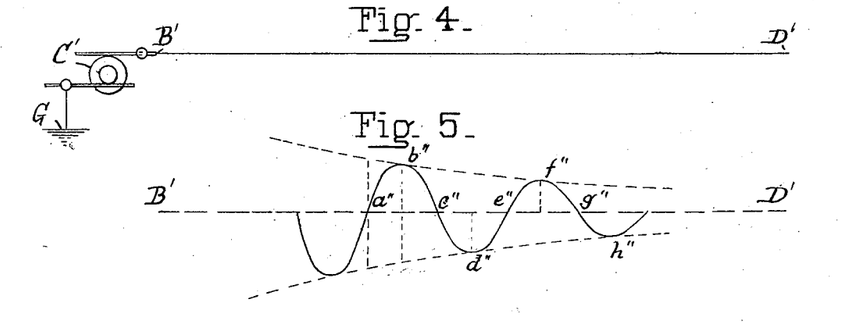
Fig. 4 is a diagram illustrating an electrical generator of alternating currents and a conductor leading therefrom, the system being grounded at one end only.
Fig. 5 is a diagram of an electrical wave propagated along the conductor of Fig. 4 when the generator impresses a simple harmonic electromotive force upon the conductor.

The vibration of the string just considered is a perfect analogy to the propagation of electrical waves in a long wire conductor B' D', Fig. 4, one end, B', of which is connected to a generator C' of simple harmonic electromotive force, the other pole of the generator being grounded at G. The existence of this analogy is due to the physical fact that the three reactions which accompany the vibration of a string—viz., the acceleration reaction, the tensional reaction, and the frictional reaction—follow the same laws as the three reactions which accompany the flow of a variable current in a long wire conductor—viz., the ohmic-resistance reaction, inductance reaction, and the capacity reaction. That is to say, the ohmic resistance, the self-inductance, and the reciprocal of the capacity of the conductor, all per unit length, correspond, respectively, to the coefficient of friction, the density, and the tension of the string.

In Fig. 5 the line B' D' represents the wire conductor B' D' of Fig. 4. The ordinates of the curve $a''\ b''\ c''\ d''\ e''\ f''$ represent the instantaneous values of the current at the various points of the conductor. This current curve is of the same form as the curve of the string illustrated in Fig. 3. The magnetic energy of the current corresponds to the kinetic energy of the vibrating string, and just as a dense string transmits mechanical energy more efficiently than does a light string so a wire of large self-inductance per unit length will under otherwise the same conditions transmit energy in the form of electrical waves more efficiently than a wire with small self-inductance per unit length, for a wire of large self-inductance can store up a given quanty of magnetic energy with a smaller current than is necessary with a wire of small self-inductance. When the process of storing up magnetic energy is accompanied by small currents, the heat losses will be smaller than when this process is accompanied by large currents, and smaller heat losses mean smaller attenuation and therefore higher efficiency. A few numerical examples about to be discussed will illustrate this accurately and fully. Before discussing the examples I shall give two definitions. On page 122 of the paper on "Propagation of Long Electrical Waves" mathematical expressions are given for the two most important constants, to which the names of "wave-length constant" and "attenuation constant" are assigned in this application. The mathematical expressions for these constants, which are represented by symbols $\alpha$ and $\beta$, respectively, are as follows:

$$\alpha = \sqrt{\tfrac{1}{2} p \, C} \{\sqrt{p^2 L^2 + R^2} + p L\},$$
$$\beta = \sqrt{\tfrac{1}{2} p \, C} \{\sqrt{p^2 L^2 + R^2} - p L\},$$

where $L$ = self-inductance of the wire per mile.

$C$ = capacity of the wire per mile.

$R$ = ohmic resistance of the wire per mile.

$$p = \frac{2\pi}{T}.$$

$T$ = period of the impressed electromotive force.

The physical significance of these two constants can be stated in a simple manner. Let $$\lambda = \text{wave length.}$$

Then $$\lambda = \frac{2\pi}{\alpha}.$$

Hence the name "wave-length constant," which is applied to it in this specification. Again, let a wave of amplitude U start from point B', Fig. 4. By the time it reaches a point at a distance $s$ from B' its amplitude will be U $e^{-\beta s}$ where $e$ is the base of Naperian logarithms. The constant $\beta$ measures the attenuation. Hence the name "attenuation constant," which is assigned to it in this application. The expression $e^{-\beta s}$ is called in this specification the "attenuation factor," because it is the factor by which the initial amplitude has to be multiplied to get the amplitude at a point at distance $s$ from the source. I shall consider now three distinct numerical examples for the purpose of showing how these constants influence the transmission of electrical energy over long wire conductors.

Underground cables for telephonic communication in New York city are now constructed which have the following values per mile:

$L = 0$, (very nearly.)

$C = 5 \times 10^{-8}$ farads.

$R = 20$ ohms.

The formulæ for $\alpha$ and $\beta$ reduce in this case to $$\alpha = \sqrt{\tfrac{1}{2} p \, C R}.$$
$$\beta = \sqrt{\tfrac{1}{2} p \, C R}.$$

Let $$p = 2\pi \times 3{,}000 = 19{,}000, \text{ (roughly.)}$$

I select the frequency of three thousand p. p. s. because this is according to all authorities far beyond the highest frequency which occurs in the telephonic transmission of speech. I shall show that even for this high frequency the attenuation can be much reduced by adding inductance to the cable. We get for this frequency $$\alpha = .0974.$$
$$\beta = .0974.$$

The wave-length $\lambda = \dfrac{2\pi}{\alpha} = 64$ miles, in round numbers.

The attenuation over a distance of two hundred and fifty miles (approximately equal to the distance between New York and Boston) is obtained as follows: Let U be the initial amplitude or amplitude of current in New York, then the current in Boston will be $$U \, e^{-250\beta} = U \, e^{-24}.$$

Figure 8:
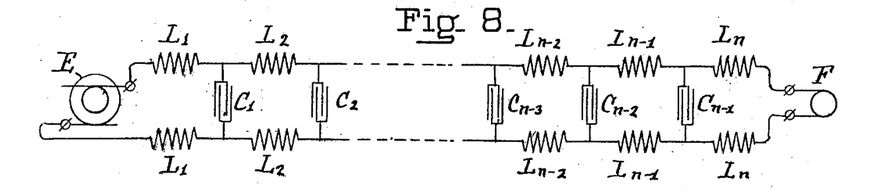
Fig. 8 is a diagram illustrating what is here called a "slow-speed" conductor of the first type.
Figure 9:
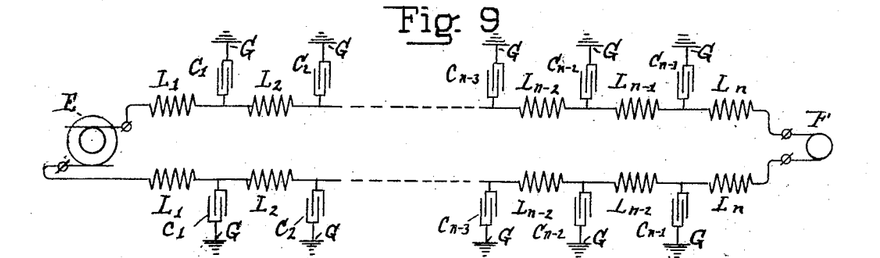
Fig. 9 is a diagram of a modified slow-speed conductor of the first type.

This means that practically no current whatever reaches Boston. The ohmic resistance wipes out completely the wave energy even before the wave has progressed half-way between New York and Boston. Even if it were possible to substitute a heavier wire, so as to make R equal five ohms, we should have current in Boston equal current in New York multiplied by $e^{-12}$, (it being assumed that the capacity is not increased.) Under such conditions telephonic communication between New York and Boston would be impossible, even over this heavy wire cable. The same is true even if we assume that the highest important frequency in telephony is much less than three thousand p. p. s. Let us see now how the twenty ohms per mile cable will act if we suppose that by some means its self-inductance per mile is increased to L equals .05 henry. This would be about ten times the self-inductance per mile of the long-distance-telephone wire between New York and Chicago. The wave length and the attenuation constant of such a cable would be approximately $$\lambda = 6.66 \text{ miles,}$$
$$\beta = .01 \text{ miles,}$$

and current in Boston equal current in New York multiplied by $e^{-2.5}$. Under these conditions telephonic communication over such a cable would be practicable even over a distance of one thousand miles. These numerical examples show clearly the enormous beneficial effects of inductance. Section I of my paper (cited above) gives a résumé of the existing mathematical theory bearing upon this subject and calls particular attention to the importance of inductance in long conductors. I was the first to verify this theory by experiments, and these experiments are described in the first part of Section III of the paper cited above. These experiments were not only the first experiments on record on long electrical waves, but they also form a part of the experimental investigations by means of which the invention disclosed in this application was first reduced to practice by me. The theories so far discussed recommend strongly the employment of line conductors of high inductance for long-distance transmission of power by electrical waves; but they do not tell us the way of constructing lines which will have this very desirable property. The additional theory necessary for any advance in this direction was first worked out by me. A part of my investigations in this direction was published in Sections II and III of the paper cited above. Figs. 8 and 9 of the drawings, which accompany this specification, are copies of Figs. 4 and 5 of that paper. Referring now to Fig. 8, E is an alternator, and F is a receiving apparatus, say a telephone-receiver. $L_1$ $L_2$ to $L_n$ are small coils without iron wound on wooden spools, each coil having a self-inductance of approximately .0125 henry and a resistance of 2.5 ohms. These coils are connected in series, forming a continuous line, which connects the alternator E to the receiving instrument F. In the actual apparatus, part of which is shown in Fig. 11 of said paper, there were four hundred coils. $C_1$ $C_2$ to $C_{n-1}$ are small condensers connecting opposite points of the line. Referring now to Fig. 9, the condensers $C_1$ to $C_{n-1}$ are shown as connecting the points between the consecutive coils to the ground G. The capacity of each condenser was approximately .025 microfarad. The mathematical theory of the flow of an alternating current in such a conductor, which I have called a "slow-speed" conductor, is given in Section II of the paper cited above. It is, so far as I know, entirely new. Its principal object was to find an answer to the question in how far such a conductor resembles an ordinary telephone-line with uniformly-distributed self-inductance, capacity, and resistance. The answer which this theory gives is perfectly definite. The answer given in the paper is that up to a frequency of one thousand p. p. s. such a line represents very nearly an ordinary telephone-line having per mile an inductance of .005 henry, a resistance of one ohm, and a capacity of .01 microfarad; but even for a frequency of three thousand five hundred p. p. s. a slow-speed conductor represents, if not very nearly, still quite approximately, an ordinary line with uniformly-distributed inductance, resistance, and capacity, the approximation being quite within the limits of my errors of observation, (between one and two per cent.,) and this is true with a much higher degree of accuracy for lower frequencies; therefore quite accurately for all frequencies which are of any importance in the telephonic transmission of speech. A high-potential or high-self-inductance line has not only the advantage of small attenuation, but another of the greatest importance in telephony, and that is very small distortion in the sense that all frequencies which are present in the human voice are attenuated in very nearly the same degree. It is therefore a distortionless line. I have evolved the following general rule: If $n$ be the number of coils per wave length, then for that wave length the slow-speed conductor will represent an ordinary telephone-line with the accuracy of the formula—

$$\text{Sin.} \frac{\pi}{n} = \frac{\pi}{n}.$$

Thus, for instance, when $n = 16$ $$\frac{\pi}{16} = .196.$$

$$\text{Sin.} \frac{\pi}{16} = .196 - .00122 +.$$

Figure 6:
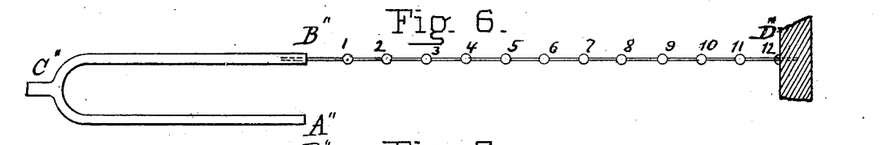
Fig. 6 is a diagram of a vibrating system similar to that of Fig. 1, but with a string which is loaded by weights distributed uniformly along its length.
Figure 7:
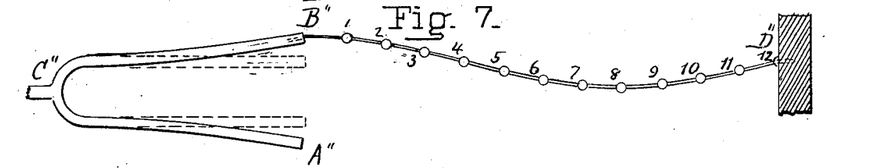
Fig. 7 is a diagram illustrating the waves set up in this string when executing forced vibrations under the action of the tuning-fork in a medium which offers appreciable resistance to the vibration of the string.
Figure 10:
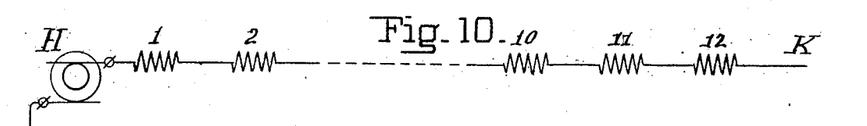
Fig. 10 is a diagram of a slow-speed conductor of the second type, called also in this specification a "reactance conductor.

Hence $\sin. \frac{\pi}{16}$ differs from $\frac{\pi}{16}$ by about two-thirds of one per cent. of the value of $\frac{\pi}{16}$. This rule was found by me theoretically and verified experimentally by experiments described in Section III of paper cited above. A conductor constructed in the manner just described was called by me a "slow-speed" conductor, because the velocity of propagation along such a conductor is smaller than along ordinary lines. Another technical term should be explained now. Much convenience of expression is derived from an introduction of what I call the "angular distance" between two points on a line conductor. Thus we can say that two points at a linear distance of a wave length have an angular distance of $2\pi$. With this understanding it follows that two points at a linear distance of $\frac{\lambda}{n}$, where $\lambda$ equals wave length, will have an angular distance of $\frac{2\pi}{n}$. The rule given above can now be stated as follows: A slow-speed conductor resembles an ordinary line conductor with a degree of approximation measured by the ratio of the sine of half the angular distance covered by a coil to half the angular distance itself. It is now an easy matter to pass on to a second type of slow-speed conductor, which is better adapted to commercial use for the purpose of diminishing the attenuation of electrical waves. This second type of slow-speed conductor is called here a "reactance-conductor." Referring to Fig. 10, H is the transmitting, and K the receiving, end of a long electrical conductor 1, 2, to 10, 11, 12, K. At points 1, 2, to 10, 11, 12 I introduce equal coils in series with the line and let the distance between any two successive coils be the same. This equality of coils and distances is not absolutely necessary, but preferable. We have now another type of slow-speed conductor. This slow-speed conductor, which I shall refer to as the "second type" or simply "reactance" conductor, differs from those of the first type described in that it has in place of the lumped capacity distributed capacity only, and also it has, in addition to the lumped self-inductance and lumped resistance, evenly-distributed inductance and resistance. This slow-speed conductor of the second type is evidently much less of a departure from an ordinary line conductor than the slow-speed conductor of the first type. It is therefore a reasonable inference that the slow-speed conductor of the second type will operate like an ordinary line under the same conditions under which the slow-speed conductor of the first type so operates, and that is when the value of half the angular distance between two consecutive coils is approximately equal to its sine. This rule is the foundation upon which the invention described in this application rests. A careful research of this matter was made by me, and the truth of the rule just given as applied to slow-speed conductors of the second type has been completely verified. The results of this research, which will be published in the near future, will be explained in language devoid of mathematical symbols, the object being to explain in as simple a manner as is possible the action of a reactance-conductor. I shall employ again the analogy of a vibrating string. In Fig. 6, A" B" C" is a tuning-fork rigidly fixed at its neck C". The full line B" D" represents a heavy flexible inextensible string which is under tension and fixed at D". The circles equally distributed over the string B" D" represent equal masses attached to the string. Let now the tuning-fork vibrate with a suitable period, so as to develop in the beaded string a vibration the wave length of which is equal to or greater than distance B" D", somewhat as shown in Fig. 7. The vibration of the beaded string (represented in Fig. 7) will then to within an accuracy of a fraction of one per cent. be the same as that of a uniform string of the same length, tension, frictional resistance, and mass which the beaded string has. The mechanical vibration in such a string is a perfect analogy to the electrical vibration in an electrical conductor. (Represented in Fig. 10.) In this diagram the alternator H is supposed to develop approximately a simple harmonic electromotive force. One pole of the alternator is grounded at G. The other pole is connected to a wire conductor. At equal distances 1, 2 to 10, 11, 12 are inserted in series with the line 12 equal coils. Suppose now that the electromotive force impressed by the alternator develops in the conductor an electrical vibration three-fourths the wave length of which covers the distance or a greater distance. Then the law of flow of the current in this conductor will be the same as the law of distribution of velocity in the beaded string of Figs. 6 and 7. This mechanical analogy besides being instructive offers also an inexpensive method of studying the flow of current in long wire conductors. A few experiments with beaded strings excited by tuning-forks will convince one soon of the soundness of the physical basis on which rests the invention described in this application. A reactance-conductor is a long electrical wire conductor having preferably equal reactance sources in series at preferably equal intervals. Such a conductor, just like the slow-speed conductor of the first type, is equivalent to a uniform wire conductor of the same inductance, capacity, and resistance per unit length when the angular distance between two successive coils is such that one-half of this distance is approximately equal to its sine. Such a conductor will therefore possess low attenuation and inappreciable distortion if its reactance per unit length is large in comparison with its resistance. This condition can be readily fulfilled in conductors of this kind. When the interpolated reactance sources consist of simple coils, they should be made, preferably, without iron cores, so as to avoid as much as possible hysteresis and Foucault-current losses and current distortion. This can be done in every case without making the coils too bulky or too high in ohmic resistance. If for any special reasons coils of small dimensions per unit inductance are required, then iron or preferably the finest—that is, springiest—quality of steel should be employed and the magnetization kept down as much as possible. For telephony the angular distance between any two successive coils should sufficiently satisfy the rule given above for the highest frequency, which is of importance in the telephonic transmission of speech.

I shall now show how the rules explained so far in this specification can be applied in practice by working out two particular cases, giving all the instructions which I believe are necessary to those skilled in the art.

(a) Suppose that it is required to transmit speech telephonically over a distance of three thousand miles of wire stretched upon poles. The total attenuation factor over that distance should be about the same as that over the best New York-Chicago circuits of the American Bell Telephone Company, which is (leakage not included) about $e^{-1.5}$ for the highest frequency of importance in speech—namely, about fifteen hundred p. p. s. It is proposed to state first the conditions which will give an attenuation factor of $e^{-1.5}$ with a length of three thousand miles. Let $\beta$ = the attenuation constant.

$l$ = distance = 3,000 miles.

$e^{-3,000\,\beta}$ = the attenuation factor = $e^{-1.5}$.

Then $$3{,}000\,\beta = 1.5.$$

Assume that a copper wire of four ohms per mile resistance is used and that the additional resistance introduced by the inductance-coils is .6 ohm per mile. The total resistance per mile will then be 4.6 ohms. When the reactance per mile is sufficiently great in comparison to the resistance, we have the following simplified formula for the attenuation constant:

$$\beta = \frac{R}{2}\sqrt{\frac{C}{L}}.$$

Observe that $\beta$ is independent of the frequency and that therefore the reactance-conductor is distortionless. The capacity C for a wire of four ohms per mile is .01 microfarad, the wire being hung as the long-distance air-lines of the American Bell Telephone Company are hung. The inductance of the wire can be neglected, and I shall consider L as due solely to the inductance of the inductance-coils inserted. The value of the inductance which will satisfy the assumed conditions can be calculated from the formula just given, as follows:

$$3{,}000\,\beta = 3{,}000\,\frac{4.6}{2}\,\frac{1}{1{,}000}\sqrt{\frac{.01}{L}} = 1.5.$$

Hence $$L = .2 \text{ henry}.$$

Having calculated the inductance per mile, the next step is to calculate the wave length for the highest frequency to be considered—namely, fifteen hundred p. p. s.:

$$\lambda = \frac{2\pi}{\alpha} = \frac{2\pi}{p\sqrt{LC}} = \frac{1}{\frac{1{,}500}{10^3}\sqrt{.2 \times .01}} =$$

15 miles, approximately.

A sufficiently-high degree of approximation to a uniform telephone-line will be obtained if we use fifteen coils per wave length of the highest frequency. This is one coil per mile. The inductance of each coil will be L equals .2 henry. Its resistance should be sixth-tenths of an ohm. To wind such a coil using no iron, take about sixteen hundred feet of wire of two ohms per mile and wind it into a coil of five inches internal diameter and twelve inches in length. The line just described has a comparatively-high inductance. It is therefore a high-potential line. Transmitter-coils of a larger transformation ratio than those employed at present will be found more suitable for working over lines of high reactance.

To take another case, suppose it be required to transmit speech telephonically over a submarine cable two thousand miles long. In this case inductance-coils of small volume are preferable on account of considerations of mechanical construction. To secure high inductance with small volume, steel or iron cores should be used to avoid excessive ohmic resistance. Coils having iron cores are a source of three kinds of losses—viz., those due to Foucault currents, hysteresis, and ohmic resistance. Each one of these losses has to be very small if the coil is to be efficient. I have found that this can be accomplished, at any rate, when it is required to transmit only small quantities of energy. If the core is finely subdivided, Foucault currents are negligible, especially for exceptionally-weak magnetizations, such as will be employed in the case before us. It will now be shown that hysteresis also can be made negligibly small. Let the wire have a resistance of five ohms per mile. According to present cable construction the capacity per mile with wires of such size is very nearly three-tenths of a microfarad. Introduce inductance-coils at proper distances so as to make the inductance three-tenths of a henry per mile, and suppose that these coils add one ohm per mile, thus increasing the ohmic resistance to six ohms per mile. The attenuation factor and wave length for a frequency of fifteen hundred p. p. s. will be $$2{,}000\,\beta = 6.$$

Hence $$e^{-2{,}000\,\beta} = e^{-6}.$$

$$\lambda = \frac{1}{1{,}500\sqrt{LC}} = \frac{1}{1.5 \times .3} =$$

2 miles, approximately.

To secure a close approximation to the rule above given, it will be necessary to introduce sixteen coils per wave length or eight coils per mile. The self-inductance of each coil will then be .0375 henry. The resistance of each coil will be .0125 ohm. Employing cores of iron or well-annealed steel, coils of this inductance can be readily made which will be small enough to go within the sheathing of a submarine cable as these are constructed to-day and at the same time show negligibly-small Foucault-current and hysteresis losses.

Figures 11, 12:
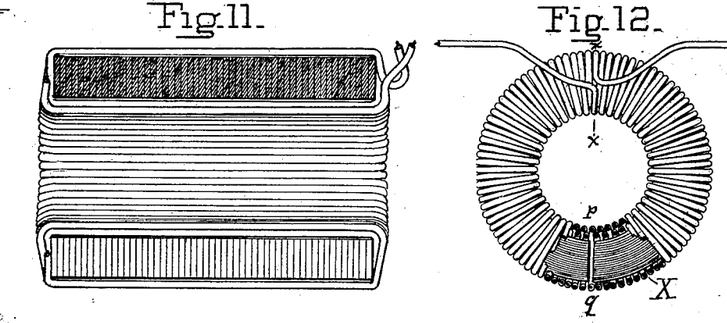
Fig. 11 is a sectional view of a transformer having an iron core made up of thin plates.
Fig. 12 is the end view of the same transformer.

In Fig. 11, X' is a ring-shaped steel disk. Its internal diameter is 2.5 centimeters, and its external diameter is 6.5 centimeters. Its thickness is .002 centimeter or about .005 inch. It has a narrow slit $p\,q$. A core is built up by piling together a sufficient number of such disks to give the required length, which we will assume is ten centimeters. In Fig. 11 a transverse section of such a core is represented. Wind this core with two layers of wire having 8.5 ohms resistance per mile. Let each layer have forty-eight turns. The length of the wire will be eighty feet, and its ohmic resistance will therefore be a little more than .125 ohm. Eight coils per mile will therefore add one ohm per mile to the resistance, making the total resistance six ohms per mile. To calculate the inductance, the permeability of the iron must be known. In telephony the maximum value of the current at the sending-station is generally less than .0001 ampere or .00001 unit of a current in the centimeter gram second system. The magnetomotive force of the magnetic circuit is for this value of the magnetizing-current $$M = 4 \pi s C = 4 \pi \times 96 \times 10^{-5}.$$

The intensity H of the magnetizing force will be $$\frac{M}{l} = H,$$

where $l$ is the mean length of the magnetic circuit equal to ten centimeters, (roughly.) Hence $$H = \frac{4 \pi \times 96}{10^6} = .0012.$$

For excessively-feeble magnetizing forces of this kind the magnetic permeability $\mu$ of first-class iron is about one hundred and eighty. (See Ewing on *Magnetic Induction in Iron and Other Metals*, p. 119, especially Sec. 87.) The intensity of magnetic induction will be B = 180 × .0012 = .2 lines of induction per square centimeter. At this excessively-low induction there is no hysteresis. (See Ewing, cited above, Sec. 89, especially top of page 128 and Sec. 180.) The inductance of the coil can now be easily calculated. The formula is $$L = \frac{4 \pi s^2 q \mu}{l \times 10^9},$$

where $s$ = number of turns = 96.

$q$ = cross-section of core in c. □ = 20.

$\mu$ = permeability = 180.

Hence $$L = .042 \text{ henry.}$$

The diameter of the coil when finished will be less than 2.5 inches and its length 4.25 inches. Such a coil can be placed conveniently within the sheathing of a submarine cable. Its diameter can very easily be reduced by increasing its length.

It should be observed here as a warning that unless inductance-coils with iron cores are constructed in such a way as to keep down the magnetization, hysteresis, Foucault-current losses, and distortion of current by the varying value of the magnetic permeability at each cycle of magnetization will work disastrously. The limit of magnetization permissible will not, however, be passed, even if the magnetizing-current is thirty-times as large as is assumed above—that is, the magnetizing-current can be as high as three milliamperes, (see Ewing, Sec. 87,) a strength of current which is capable of operating telegraphic apparatus. It should also be observed that the iron core represented in Figs. 11 and 12 can be made by winding very fine iron wire, the plane of the windings being perpendicular to the axis of the cylindrical tube which constitutes the core. The advantage of this core is that it still further reduces the Foucault-current losses, and also prevents magnetic creeping. (See Ewing, end of Sec. 89.) The cross-section of the wire core would have to be made larger than that of the plate core to allow for the more imperfect filling up of the available space by the substance of the wire.

The invention has been explained with reference to telegraphy and telephony; but it is also applicable to the transmission of power by alternating currents.

It is to be understood that only the simplest and most direct manner of increasing the reactance of the line has been shown—viz., by introducing simple coils. There are, however, various other ways known in the art of producing the same effect. For instance, I may have each reactance-coil provided with a secondary winding and place a condenser in circuit with this secondary. By properly adjusting the capacity of the condenser the effective inductance and the effective resistance of the reactance-coil can be increased or diminished within somewhat-wide limits; but the simplicity and uniformity attainable with the simple coils described at length in this specification and illustrated by mechanical analogies makes it, in my opinion, the best method. In all of these arrangements the reactance of the line per unit length is increased by introducing reactance sources at various points along the line, referred to in the claims as "reactance sources." The particular means of increasing the reactance is not important, the fundamental idea of the invention being to transmit energy with small current by adjusting the reactance of the line, thereby diminishing heat losses and resulting attenuation. The equivalence between a reactance-conductor of the second type and its corresponding uniform conductor holds true with respect to free vibrations also. It holds true also for periodic unidirectional impulses, because, since each unidirectional electrical impulse employed in ordinary telegraphy and cabling can be represented by a convergent series of simple harmonic impulses which are harmonically related to each other, it follows that a reactance-conductor will act like its corresponding uniform conductor for ordinary methods of telegraphy by unidirectional electrical impulses if the reactance-conductor satisfies the rule given above for a frequency the period of which is sufficiently small in comparison to the time of duration of the unidirectional impulse. Their ratio should equal twenty-five or more.

It should be mentioned here that I have so far described reactance-conductors which are a close approach to a uniform conductor for a given frequency and all frequencies smaller than this given frequency and have specified that sixteen coils per wave length corresponding to that given frequency should be used; but such a close resemblance between the two is in many cases not required, so that a considerably-smaller number than sixteen coils per wave length may be employed. In all cases, however, the construction and the distribution of the reactance-coils will be governed by the character of the variable electromotive force which is to be impressed upon the line and the form of the resulting current wave and by the amount of attenuation with which it is proposed to work in a way which can be easily deduced from the rule given above.

It will be seen from the foregoing description that the method of diminishing the attenuation of electrical waves transmitted over a conductor consists in distributing along the conductor reactance sources of sufficient strength and making the reactance sources sufficient in number relatively to the wave length to secure the attenuation constant and the degree of approximation of the resulting non-uniform conductor (consisting of the uniform conductor and the distributed reactance sources) to a uniform conductor as the requirements of the particular problem necessitate. The conductor will then act with respect to the electrical waves, within the proper limits of periodicity—that is, for the shortest waves to be considered and all longer waves—as a uniform conductor having the same resistance, inductance, and capacity per unit length. It will of course be noted that the character of the waves to be transmitted as defined by the periodicities contained in it is the controlling factor determining the distribution of the inductance sources.

It will be seen from the foregoing statement that this invention applies to "electrical wave transmission" and involves the construction of a "wave-conductor." If the length of the conductor relatively to the wave length of the current transmitted is sufficiently great to permit the development of the wave phenomenon, then there is wave transmission; but if the conductor is too short for this there is mere ordinary direct transmission. The distinction is that if there is no perceptible development of waves there is no perceptible attenuation, and therefore the invention does not apply. The term "wave-conductor" is intended to indicate a conductor which forms a part of a system of conductors over which electrical energy is transmitted by electrical wave transmission. The use of these terms in the claims is intended to bring out the distinction here stated.

It will be noted that I have herein described a method of modifying a conductor of uniformly-distributed capacity, resistance, and reactance in such manner as to diminish its attenuation constant by increasing its effective inductance without affecting seriously its character as a uniform conductor with respect to the waves to be transmitted. This I accomplish by distributing along the uniform conductor reactance sources at periodically-recurring points, the distance between the points being determined by the considerations heretofore presented. There results from this method a non-uniform wave-conductor consisting of a uniform wave-conductor have reactance sources distributed at periodically-recurring points along its length in such manner that the resulting wave-conductor is equivalent within proper limits to the corresponding uniform conductor from which it is produced, except that it has increased effective inductance. It will of course be understood from the foregoing discussion that the distance between the reactance sources is determined by the wave length to be transmitted or the wave lengths which constitute the components of a complex wave to be transmitted and by the required degree of approximation to a corresponding uniform conductor with respect to distortion and attenuation of the waves to be transmitted.

I do not in this application claim the art of reducing attenuation herein described, as that is claimed in my other application, entitled "Improvements in the art of reducing attenuation of electrical waves," filed May 28, 1900, Serial No. 18,305, which application is a division hereof pursuant to a requirement by the Patent Office that this application be divided, so as to separate apparatus from method claims.

It will be obvious that many changes can be made without departing from the spirit of my invention. Therefore, without limiting myself to the precise details shown,

What I claim as new, and desire to secure by Letters Patent of the United States, is—

1. In a system of electrical wave transmission a non-uniform wave-conductor consisting of a conductor having reactance sources distributed at points along its length in such manner that the resulting wave-conductor is equivalent, within proper limits, to its corresponding uniform conductor, but of increased effective inductance, substantially as described.

2. In a system of electrical wave transmission a non-uniform wave-conductor consisting of a uniform conductor, along which reactance sources are distributed, the total reactance and the distance between the reactance sources being determined by the wave lengths to be transmitted, and by the required degree of approximation to a uniform wave-conductor, substantially as described.

3. In a system of electrical wave transmission, a non-uniform wave-conductor consisting of a uniform conductor and inductance-coils in series in it at periodically-recurring points, the inductance, resistance and capacity of the interposed inductance-coils being adjusted in such a way as to give, with the inductance, resistance and capacity of the uniform conductor, a predetermined inductance, resistance and capacity per unit length, and the distance between the interposed coils being adjusted in such a way as to equal a fractional part of one-half of the shortest wave length which is to be transmitted, substantially as described.

4. In a system of wave-conductors, the combination of a telephonic transmitter and a telephonic receiver, a non-uniform wave-conductor consisting of a uniform conductor and inductance-coils in series therein at periodically-recurring points, the inductance, resistance and capacity of the interposed inductance-coils being adjusted in such a way as to give to the resulting conductor a predetermined inductance, resistance and capacity per unit length, and the distance between the interposed coils being adjusted in such a way as to be equal to a fractional part of one-half of the wave length corresponding to the highest frequency essential to the transmission of speech, substantially as described.

5. In a system of electrical transmission by means of electrical waves, a non-uniform wave-conductor consisting of a uniform wave-conductor with inductance-coils in series with it at periodically-recurring points, the inductance, resistance, and capacity of the coils being such as to give, with the inductance, resistance, and capacity of the uniform conductor such average value for the inductance, resistance and capacity of the non-uniform conductor per unit of length as will satisfy the conditions of the required attenuation constant; and the distance between consecutive inductance-coils being equal to or less than one-sixteenth of the smallest wave length which is to be transmitted, substantially as described.

6. In a system of electrical transmission of speech by means of electrical waves, a non-uniform wave-conductor consisting of a uniform wave-conductor with inductance-coils in series with it at periodically-recurring points; the inductance, resistance, and capacity of the coils being such as to give with the inductance, resistance and capacity of the uniform conductor such an average value for the inductance, resistance, and capacity of the non-uniform conductor per unit length as will satisfy the conditions of the required attenuation constant; and the distance between the consecutive coils being equal to or less than one-sixteenth of the electrical wave length corresponding to any frequency which is essential to the transmission of speech, substantially as described.

7. A wave-conductor consisting of a uniform conductor and inductance sources interposed in series therein at periodically-recurring points, substantially as described.

8. A wave-conductor consisting of a uniform conductor having inductance-coils interposed therein in series at uniformly-recurring points, substantially as described.

9. A wave-conductor consisting of a uniform conductor and inductance sources without iron interposed in series therein at periodically-recurring points, substantially as described.

10. A wave-conductor consisting of a uniform conductor having inductance-coils without iron interposed therein in series at uniformly-recurring points, substantially as described.

Signed by me at New York city, New York, this 13th day of December, 1899.

MICHAEL I. PUPIN.

Witnesses:
THOMAS EWING, Jr.,
SAMUEL W. BALCH.